(12) United States Patent
Schwartzkopf et al.

(10) Patent No.: US 10,458,737 B2
(45) Date of Patent: Oct. 29, 2019

(54) FIREARM SUPPRESSOR INCLUDING THERMAL ENERGY ABSORBING ELEMENTS MANUFACTURED FROM POROUS METAL

(71) Applicants: Steven H. Schwartzkopf, Gold Beach, OR (US); Patrick R. Schwartzkopf, Gold Beach, OR (US)

(72) Inventors: Steven H. Schwartzkopf, Gold Beach, OR (US); Patrick R. Schwartzkopf, Gold Beach, OR (US)

( * ) Notice: Subject to any disclaimer, the term of this patent is extended or adjusted under 35 U.S.C. 154(b) by 0 days.

(21) Appl. No.: 15/912,903

(22) Filed: Mar. 6, 2018

(65) Prior Publication Data

US 2019/0277591 A1    Sep. 12, 2019

(51) Int. Cl.
*F41A 21/30*    (2006.01)
*F28F 13/00*    (2006.01)
*B33Y 80/00*    (2015.01)

(52) U.S. Cl.
CPC .......... *F41A 21/30* (2013.01); *F28F 13/003* (2013.01); *B33Y 80/00* (2014.12)

(58) Field of Classification Search
CPC .......................................... F41A 21/30
USPC ........................................ 89/14.4; 181/223
See application file for complete search history.

(56) References Cited

U.S. PATENT DOCUMENTS

| | | | |
|---|---|---|---|
| 916,885 A | 3/1909 | Maxim | |
| 2,798,569 A * | 7/1957 | Fischer, Jr. | F01N 1/006 181/252 |
| 3,483,794 A * | 12/1969 | Packard | F41A 21/12 42/78 |
| 3,713,362 A * | 1/1973 | Charron | F41A 21/30 89/14.4 |
| 4,454,798 A * | 6/1984 | Shea | F41A 21/30 181/223 |
| 4,530,417 A * | 7/1985 | Daniel | F41A 21/30 181/223 |
| 5,136,923 A | 8/1992 | Walsh, Jr. | |
| 5,164,535 A | 11/1992 | Leasure | |
| 6,298,764 B1 | 10/2001 | Sherman | |
| 6,575,074 B1 | 6/2003 | Gaddini | |
| 7,073,426 B1 | 7/2006 | White | |

(Continued)

FOREIGN PATENT DOCUMENTS

EP    2191223 B1    11/2011

*Primary Examiner* — Joshua E Freeman
(74) *Attorney, Agent, or Firm* — Yancy IP Law, PLLC

(57) ABSTRACT

A firearms suppressor incorporates one or more thermal energy absorbing elements, or "thermal energy sponges", fabricated from porous metal. These elements efficiently absorb heat from the propellant gas generated when the firearm is discharged, thus reducing its pressure and the blast noise it creates. The thermal energy absorbing elements are manufactured from porous metal, a material which, due to its high efficiency in absorbing thermal energy, provides a unique solution to designing smaller, lighter, modular, more efficient and less expensive to manufacture firearm suppressors. In addition, as a result of the relationship described in the Darcy-Forchheimer equation, these porous metal elements provide the suppressor with an intrinsic, self-regulating capability, thus allowing the suppressor's use with a variety of different cartridges and different calibers with little to no change to a baseline design.

18 Claims, 1 Drawing Sheet

(56) References Cited

U.S. PATENT DOCUMENTS

| | | | |
|---|---|---|---|
| 8,015,908 B2 | 9/2011 | Kline | |
| 8,807,005 B2 * | 8/2014 | Moss | F41A 21/24 |
| | | | 181/223 |
| 8,978,818 B2 | 3/2015 | Proske | |
| 9,239,201 B1 | 1/2016 | Reis Green | |
| 9,528,785 B2 * | 12/2016 | Klett | F41A 21/44 |
| 9,546,838 B2 * | 1/2017 | Liskey | F41A 21/30 |
| 2003/0145718 A1 * | 8/2003 | Hausken | F41A 21/30 |
| | | | 89/14.4 |
| 2015/0354422 A1 * | 12/2015 | Liskey | F41A 21/30 |
| | | | 89/14.4 |
| 2017/0321985 A1 * | 11/2017 | Bray | F41A 21/34 |
| 2017/0328666 A1 * | 11/2017 | Liskey | F41A 21/30 |
| 2018/0209757 A1 * | 7/2018 | Hibbitts | F41A 21/30 |

* cited by examiner

FIREARM SUPPRESSOR INCLUDING THERMAL ENERGY ABSORBING ELEMENTS MANUFACTURED FROM POROUS METAL

BACKGROUND OF THE INVENTION

1. Field of the Invention

The invention relates in general to a firearm suppressor, also known as a silencer; a muzzle device for reducing the blast noise which occurs during the discharge of a firearm, and, in particular, to such a device incorporating into its design one or more thermal energy absorbing elements manufactured from porous metal.

2. Description of Related Art

To anyone with even a modest amount of firearms experience, it is well known that firing a bullet creates a loud blast noise. This noise is caused by the high pressure propellant gas as it exits the muzzle of the firearm immediately behind the bullet. The magnitude of this noise is generally proportional to the diameter of the bullet being fired. For example, firing a .22 caliber rifle produces less noise than does firing a large caliber hunting rifle such as a .30-06. However, regardless of their caliber, when firearms are discharged, they all produce an undesirably large amount of blast noise; an amount that can potentially cause permanent damage to a person's hearing acuity. In addition, the blast noise produced is usually undesirable in military and law enforcement applications, not only because of the potential threat of hearing loss to anyone in the immediate vicinity when a firearm is discharged, but also because the blast noise can expose the position of the person operating the firearm. Thus, a device that reduces the noise to lower, safe levels is not only desirable for promoting the hearing health of firearms users, but also for providing a significant tactical advantage in military and law enforcement applications.

A wide variety of different designs have been previously proposed as suppressors/silencers for mounting on the ends of gun barrels. A majority of such devices have generally consisted of formed metal muzzle extensions incorporating various baffles, machined orifices, etc. Such prior designs tended to be larger and heavier than desired. The flexibility of previous designs was very low, often requiring substantial and expensive design changes when attaching such devices to different calibers of firearms. Additionally, the cost of manufacturing such devices, with their often numerous, intricately formed and assembled components, was substantial.

In order to reduce the blast noise associated with the discharge of a firearm, it is necessary to reduce the pressure of the propellant gas that exits the muzzle of the firearm behind the bullet. At the most fundamental level, methods for reducing the propellant gas pressure can be conceptualized based upon the Ideal Gas Law, which states:

$$P = \frac{nRT}{V}$$

where:
P is the pressure of the gas,
n is the amount of the gas (in moles),
R is the ideal, or universal, gas constant (equal to the product of the Boltzmann constant and the Avogadro constant),
T is the absolute temperature of the gas, and
V is the volume of the gas.

From the Ideal Gas Law equation, it is clear that it mathematically embodies two specific relationships which can each form a nexus for generating design concepts that reduce propellant gas pressure. In the case of the first relationship—the indirect relationship between pressure and volume—it is clear that allowing the high pressure propellant gas to expand into a "can" (i.e., a large, usually cylindrical, casing or housing of enclosed volume with usually only an entrance port attached to the firearm's muzzle and an opposing exit port from which the bullet leaves the suppressor), as it leaves the muzzle and before venting it into the atmosphere will immediately permit its volume to expand in a controlled manner, and thus reduce both its pressure and its noise level.

This fundamental design concept has been used in the vast majority of suppressor designs developed since the first firearm suppressor was patented. In addition, secondary, design features (e.g., internal baffles, chambers, nozzles, flow directors, channels, diffusers, etc., as well as external grooves, dimples, additional vent holes, etc.), are added to the "can" to assist in further reduction of pressure and noise. These secondary design features typically function by helping reduce the temperature of the propellant gas to further reduce overall gas pressure, or by advantageously controlling the gas flow so that, for example, different gas steams mix with one another, or that the release of the propellant gas pressure into the atmosphere is spread over a longer time period, or even that the gas pressure is even converted into different sound frequencies to which human hearing is less sensitive, thus decreasing noise level.

In the second case, because of the direct relationship between pressure and temperature expressed in the Ideal Gas Law, a significantly lesser number of suppressors have been designed to function primarily by reducing the temperature of the propellant gas to decrease its pressure and thus the noise it creates. These designs most frequently either incorporate an evaporative substance (e.g., oil, grease, or water) which reduces the gas temperature by absorbing heat through its vaporization when exposed to the high temperature propellant gas or they incorporate a heat exchange medium of some type that is able to partially reduce the temperature of the propellant gas, and frequently diffuse the gas as it is released into the atmosphere.

Although the designs that utilize an evaporative substance have been documented as being effective—as long as the supply of the evaporative substance lasts—they are less common than those based on the first concept and they tend to be used principally in less powerful pistol caliber applications. Even less common are designs which incorporate some sort of porous metal as a combination heat absorber and gas diffuser. These designs have been based upon different types of porous metals, including steel (or other metal) wool, mesh screens, and reticulated metal (e.g., aluminum) foam.

Despite the successful development of suppressor designs based on both of the above fundamental Ideal Gas Law relationships, both conceptual design families display a number of problems. For example, the baffled "can" type of suppressors are complicated and expensive to manufacture, which has significantly limited their utility. This manufacturing difficulty is largely due to the opposing requirements for minimum clearance (between the bullet and the bore openings cut in the baffles for bullet clearance) to yield maximum pressure reduction, and the tolerance "stack-up" error of the multiple components which must be controlled during assembly to ensure proper alignment. This type of suppressor also suffers from the disadvantage of being relatively large and heavy, especially for larger caliber bullets. For instance, it is not unusual for this type of suppressor to be 6"-12" long and have a diameter approximately five times the firearm's muzzle diameter. Alignment errors are much reduced in "monocore" suppressor designs, because the entire device is manufactured from a single piece of metal. However, although characteristic of both baffled- and monocore suppressor designs, the monocore suppressors are especially unlikely to be interchangeable between guns of different calibers. In some instances, they do not even perform the same when mounted on different guns of the same model. It has also been found that the suppressors can be easily misaligned by rough handling in the field. For the most part, to achieve optimum performance, these suppressors must be custom made and fitted to a particular weapon and the ammunition it uses.

Another difficulty with many prior art sound suppressor designs is that they work well with only one caliber of ammunition, or one specific bullet/powder combination for a particular caliber. As an example, one design may work well with a specific bullet/powder combination for 9 mm caliber ammunition, but it will work poorly with other bullet/powder combinations of 9 mm ammunition or with 7.62 mm NATO caliber ammunition. The gas pressure levels and bullet velocities of various types of ammunition can be quite different, and this difference affects the performance of the sound suppressor device. This has meant that a particular baffle and spacer design has to be, in some cases, extensively modified so that good performance is achieved with different caliber firearms.

For suppressors designed to function primarily through gas temperature reduction, major drawbacks exist in the use of evaporative materials, especially oil or greases. These drawback include first, that a visible gas or smoke exits from the suppressor when the firearm is discharged and second, that to maintain the levels of sound reduction achieved by the addition of evaporative materials, the user is required to replace or inject the material into the suppressor as it is consumed and sound reduction levels decrease. Instead of using oil or grease, current practice is to use a small amount of water, and this has the effect of minimizing the visible gas exiting from the suppressor after firing. Depending upon the caliber, the suppressor may require the injection or placement of the material after as few as 1 to 10 shots have been fired through the suppressor.

Permeable metal elements, including metal wool, wire screen—typically at recommended packing densities of about 5-15%—and reticulated foams made from aluminum, copper, niobium, nickel, and rhenium have been used in a few prior suppressor designs. Although some of these designs were capable of reducing propellant gas pressures as effectively as designs based upon volumetric increase of the propellant gas, they exhibited a number of unique problems. The designs that incorporated metal wool, suffered from a lack of packing uniformity, excessive blast-induced compression effects, and an increased potential of catching fire when fine metal wool was exposed to the flame of burning propellant gas. In addition, the presence of metal wool packing in the front chamber of a two chamber suppressor was actually shown to have a deleterious effect on noise reduction. The designs that incorporated both copper and aluminum screens showed rapid wear and degradation of the screen elements. With regard to the various kinds of reticulated metal foam materials that have been used in suppressors, it is known that refractory foams with void volumes of more than about 80 percent tend to disintegrate after only one or two firings. It is understood that finer pore sizes within a given void volume tended to be less durable.

It is also known that reticulated foam structures with pore sizes ranging from approximately 30 to 1000, preferably from approximately 45 to 100, pores per inch, and between approximately 50 to 90 percent porosity (void volume), are particularly suitable for use in muzzle devices. In addition, the maximum effectiveness in flash and blast reduction is believed to be achieved by allowing the hot exhaust gases to pass laterally through the reticulated refractory foam body while subject to the full pressure differential which exists between the gas at the muzzle and the ambient environment outside of the system. To this end, the exterior of the foam is generally exposed to the ambient environment without confinement. Being unconfined permits the gasses to expand away from the exterior surface to the maximum extent and at the maximum rate possible. In addition, all of the hot gas which flows laterally immediately downstream of the muzzle passes through the reticulated foam before it is ejected into the ambient environment. A defining characteristic of reticulated metal foams in general is their very high porosity, with void volumes in the range of 75% to 97%, and approximately 5 to 60 pores per inch (PPI). Additionally, these reticulated metal foams can typically accommodate pressures of up to approximately 200-300 PSI before they rupture (Reade Advanced Materials Data Sheet, Goodfellow Metal Foam Data Sheet, Selee Metpore EFCS Data Sheet). As a result of these characteristics, the reticulated metal foams have extremely low pressure drop with regard to gas flow, making them ideal for diffusion of gases in applications such as filters, demisters, gas diffusers and mixers, heat sinks, and liquid and gas separators, etc., as well as for heat absorption of gases at low pressures. As a more specific example, the stainless steel foam manufactured by Goodfellow Corp. has 93% void volume with 61 PPI. However, it must be noted that these same characteristics make the reticulated metal foams especially unsuitable as "thermal energy sponges".

BRIEF SUMMARY OF THE INVENTION

The present invention is directed to a firearm suppressor comprising one or more thermal energy absorbing elements, e.g. "thermal energy sponges" or "heat sponges", manufactured from porous metal.

BRIEF DESCRIPTION OF THE SEVERAL VIEWS OF THE DRAWINGS

The features and advantages of the present invention will become apparent from the following detailed description of a preferred embodiment thereof, taken in conjunction with the accompanying drawings, in which.

DETAILED DESCRIPTION OF THE INVENTION

The present invention is directed to a firearm suppressor comprising one or more thermal energy absorbing elements, e.g. "thermal energy sponges" or "heat sponges", manufactured from porous metal.

Figure 1:
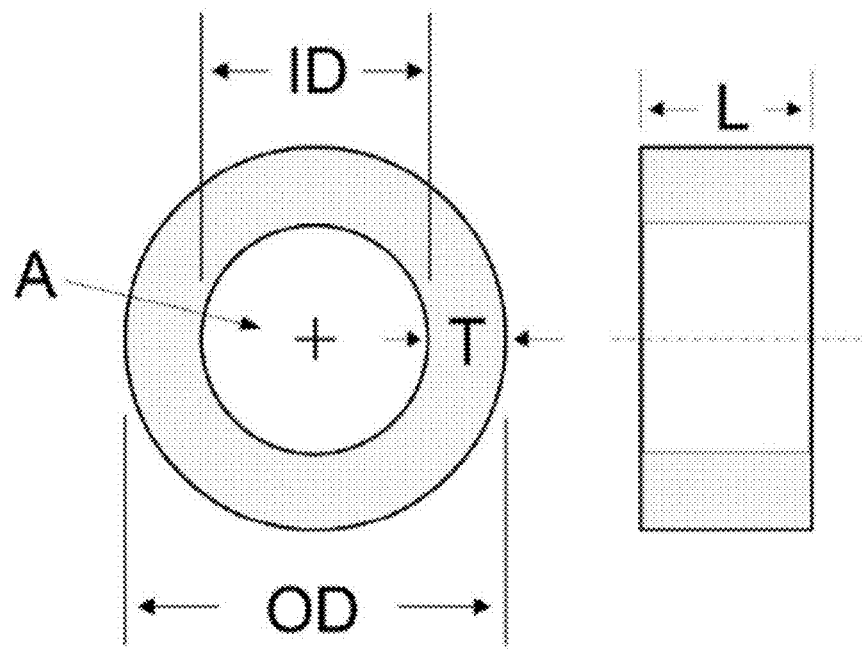
FIG. 1 shows a cross-section and side view of a typical energy absorbing element.

In one preferred embodiment as shown in FIG. 1, the thermal energy absorbing elements are tubular, with an annulus (A) of diameter ID, an outside diameter of OD, a wall thickness of T (=OD−ID), and a length of L.

In a preferred embodiment, the porous metal used as the one or more thermal energy absorbing elements are commonly manufactured by furnace sintering of powdered metals, but can also be manufactured by other methods, including additive manufacturing techniques such as laser sintering.

Figure 2:
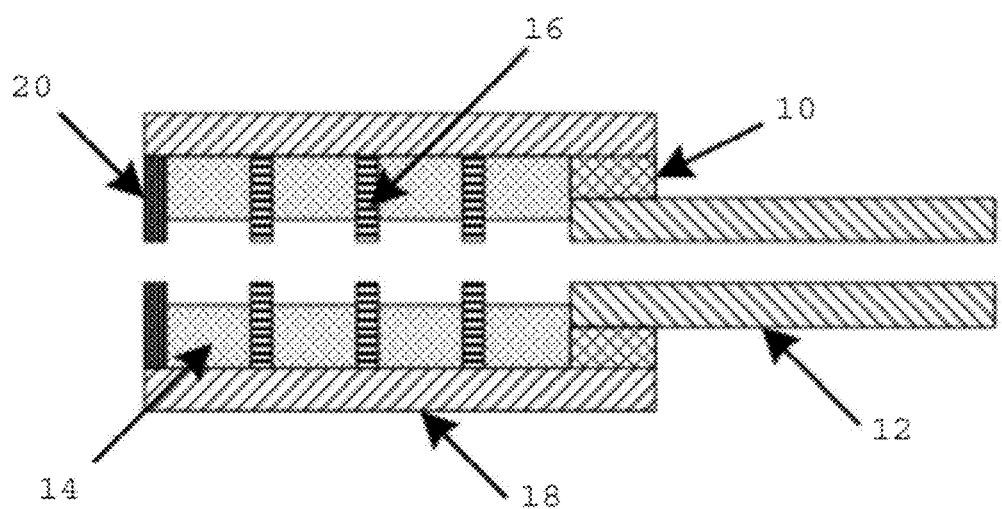
FIG. 2 shows a cross-section through one embodiment of a firearm suppressor based upon multiple energy absorbing elements provided in a tubular form.

In one preferred embodiment as shown in FIG. 2, several of the above tubular porous metal elements are combined to form a complete suppressor. This embodiment includes a threaded endcap 10 that attaches the suppressor to the firearm barrel 12, an alternating arrangement of tubular, porous metal elements 14 interposed with tubular, metal baffles 16 (which may themselves be fabricated from porous or non-porous material), all housed together in a single tubular shell or housing 18, with an opposing, endcap 20 having an opening through which the bullet exits the suppressor.

In the embodiment provided in FIG. 2, both the tubular, porous metal elements 14 and the tubular baffles 16 are oriented coaxially to the firearms muzzle, thus allowing unrestricted passage of the fired bullet. The elements 14 and baffles 16 are housed inside an external tubular housing 18 with two endcaps, one endcap 10 designed to attach to the muzzle of the firearm, and the opposing endcap 20 designed with an opening to allow the fired bullet to exit the suppressor. When multiple porous metal elements 14 are used, additional tubular baffles 16 (which may be of either porous or nonporous material) may be interspersed between the porous metal elements 14 in order to act as baffles to direct and control the flow of propellant gas inside the suppressor and to enhance thermal transfer between the porous elements for maximum heat absorption.

The embodiment described herein utilizes one or more porous metal elements as thermal energy absorbing elements (i.e., "thermal energy sponges" or "heat sponges") in order to make use of the direct relationship between gas pressure and temperature (as expressed by the Ideal Gas Law) as a mechanism for reducing propellant gas pressure and thus blast noise. It must be noted that the porous metal described in the present invention has significantly different physical characteristics from the permeable metal materials that have been used in previous suppressor designs. More specifically, the porous metal contemplated by the present invention differs from the reticulated metal foams used in previous suppressor designs as previously indicated.

The porous metal contemplated by the present invention described herein can be manufactured from a variety of metals, including stainless steel, brass, copper, nickel, titanium, refractory metals, and alloys thereof, including Hastelloy®, Inconel®, Monel®, as well as many others, by various methods including furnace sintering and additive manufacturing. However, although the porous metal material has the same specific heat as reticulated foam manufactured from the same metal, in contrast with the reticulated metal foam described above the porous metal contemplated by the present invention is much stronger and more dense. For example, porous stainless steel used in the present invention (manufactured by Mott Corp.) has void volume ranges from approximately 20% to 60% with a range of approximately 250 PPI to 250,000 PPI (Mott Porous Metal Solutions Data Sheet), and the material can accommodate pressures of over 5,000 psi. As a result, the porous stainless steel material manufactured by Mott Corp. has both a much higher surface area and a much higher pressure drop, as well as approximately 10 times higher volumetric heat capacity than stainless steel reticulated foam. As a result of its high pressure drop, any fluid (in this case, the high pressure propellant gas) flowing through the porous material experiences significant frictional heat loss. These specific physical characteristics of porous metal are uniquely well-suited to the invention described herein, and are key to the design and function of the present invention.

In the following functional description, it should be remembered that the events described occur in two phases, over the course of only a few milliseconds at most. In the first phase, when the high pressure propellant gas, which is also travelling at a high velocity, initially encounters the face of one or more thermal energy absorbing elements manufactured from porous metal, the void volume of the porous metal is at ambient pressure, and the high pressure propellant gas immediately begins infiltrating the porous metal at a high velocity. This infiltration velocity is determined by both the velocity of the propellant gas flow as it exits the firearm muzzle into the suppressor and by its pressure. Due to the tortuous path the propellant gas must follow as it infiltrates the porous metal, it experiences significant friction, and thus a significant transfer of the frictional heat into the porous metal, reducing the gas temperature and producing a concomitant pressure drop. In addition, heat from the high temperature propellant gas is also absorbed directly through contact with the porous metal. The porous metal allows for intimate contact between the hot propellant gas and the metal, leading to additional rapid transfer of heat from the gas to the metal, thus further enhancing the rapid cooling of the gas. As a result, thermal energy is very quickly removed from the propellant gas and the gas pressure in the void volume is dramatically decreased. The lower pressure of the void volume gas acts to further a continued influx of gas from the annulus of the porous metal due to the pressure differential. This influx continues until the pressure of the propellant gas in the annulus of the porous metal and the pressure of the gas in the void volume of the porous metal equalize.

Once the pressures equalize, the second phase of the process begins as the gas pressure in the annulus of the porous metal begins to lower due to forward movement of both the bullet and the propellant gas in the annulus toward the exit of the suppressor. As the gas pressure in the annulus of the porous metal decreases, the gas in the void volume begins to flow out of the porous metal material and into the annulus. Because the pressure differential between the gas in the void volume and the annulus of the porous metal is lower than in the first phase, however, this outflow occurs at a lower velocity—and thus a lower pressure drop—than the inflow, which means that thermal energy is still absorbed by the porous metal, but at a lower rate, one that is linearly correlated with gas velocity.

Unlike any other previous suppressor design, this invention is intrinsically self-regulating. The most crucial aspect of the functional performance of this invention, with regard to its intrinsic self-regulating ability, is mathematically embodied in the extended Darcy-Forchheimer equation (below), which is the most widely used formula for describing the pressure drop of fluid flowing through porous media.

$$\frac{\Delta P}{L} = \frac{\mu v}{K} + \rho C v^2$$

Where:
- ΔP is the pressure drop,
- L is the length of the sample,
- μ is the fluid viscosity,
- v is the fluid velocity,
- K is the permeability
- ρ is the density, and
- C is form drag coefficient.

For this invention, the critical functional relationship mathematically embodied in the Darcy-Forchheimer equation is that at high fluid velocity (v), the pressure drop (ΔP) increases as the square of the fluid velocity, and this "squared effect" dominates the amount of pressure drop. This means that as the velocity of the propellant gas increases, the pressure drop, and thus the frictional heat loss, that occurs as the propellant gas flows into the porous media, increase exponentially. For example, a doubling of the gas flow velocity through the porous metal element is characterized by a quadrupling of the pressure drop. This relationship means that the porous metal provides not only an extremely effective means of absorbing thermal energy from the high pressure propellant gas, thus decreasing its pressure and the noise it creates, but it also provides a unique, intrinsic, self-regulating capability. This intrinsic capability exponentially increases the pressure drop, dramatically increasing the amount of heat absorbed, as the gas velocity increases (i.e., due to higher bullet/propellant gas velocity and/or higher gas pressure), thus attenuating the propellant gas pressure and decreasing the blast noise even further.

This intrinsic capability is implemented by designing a baseline suppressor which utilizes one or more energy absorbing elements manufactured from porous metal to provide the level of noise reduction desired for the lowest-power cartridge expected to be fired in a particular caliber of firearm. Due to the velocity squared pressure drop effect described above, any more powerful, higher velocity cartridges will be suppressed at even higher levels because the increased heat from their additional power is absorbed exponentially. The blast noise reduction of the firearm suppressor according to the present invention may be at least 23.2 db. For example, blast noise reduction measured with an experimental prototype designed for 0.22 long rifle ammunition, with a bullet velocity of 1,255 feet per second (fps) and a muzzle pressure of about 2,800 psi was 19.6 db. In contrast, the measured blast noise reduction when the same experimental prototype device was tested with 0.223 (5.56 mm) ammunition, with a bullet velocity of about 2,979 fps and a muzzle pressure of about 5,717 psi, was 23.2 db. This intrinsic capability is extremely significant because it largely eliminates the need for redesigning a suppressor when changing ammunition type or caliber when the baseline suppressor is properly designed.

Additionally, the invention described herein has no need to exhaust the high pressure propellant gas to the outside atmosphere to achieve maximum effectiveness in blast reduction. Tests of the prototype mentioned above, both with and without an outside casing, showed that sound suppression increased by only 2-3% when the external casing was removed, presumably because a small amount of the high pressure propellant gas exited from inside the porous metal into the external atmosphere. The very small reduction in blast noise indicates that in this invention, one or more energy absorbing elements manufactured from porous metal function almost exclusively as heat absorbers and not as pressure diffusers.

As described herein, the invention enables modularity in design, as one or more thermal energy absorbing elements manufactured from porous metal with the same or different porosities, or even from different metals, may be arranged in series, and thus easily combined into a single suppressor. In one embodiment, one or more solid metal elements may be interposed between the one or more porous energy absorbing elements. In another embodiment, one or more intermediate metal elements of a porosity different from the one or more energy absorbing elements are interposed between one or more energy absorbing elements. Because the one or more thermal energy absorbing elements manufactured from porous metal can include a range of porosities and pressure drops, and thus heat removal capabilities, it is also possible to combine a series of thermal energy absorbing elements with differing porosities in order to tailor the suppressor design to meet the requirements of different calibers or bullet types. This sort of modular design approach makes it possible to reduce manufacturing costs, and thus the ultimate prices of suppressors based upon this invention. It also makes it easy to repair a suppressor in which one energy absorbing element is damaged by simply substituting another thermal energy absorbing element of the same metal with the same porosity.

As a result of the extreme effectiveness of porous metal in absorbing thermal energy, when a suppressor containing one of more energy absorbing elements manufactured from porous metal is attached to a firearm that fires many bullets in a very short amount of time (i.e., a machine gun), heat builds up rapidly, and it is necessary to add a design feature to quickly dissipate excess heat from the porous metal. This feature may take the form of external cooling jackets or fins on the suppressor housing, or of internal cooling channels formed in, or machined into, the energy absorbing elements themselves.

It is understood that any recitation of ranges inherently includes all of the values therein, any of which may be used as a maximum or minimum. For example, the porous metal may have a void volume ranging from approximately 20% to 60%, with a lower limit or upper limit of 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%. Likewise, the porous metal may have porosity ranging from 250 pores per inch (PPI) to 250,000 PPI, with a lower limit or upper limit of 300 PPI, 400 PPI, 500 PPI, 600 PPI, 700 PPI, 800 PPI, 900 PPI, 1000 PPI, 5000 PPI, 10,000 PPI, 25,000 PPI, 50,000 PPI, 100,000 PPI, 150,000 PPI, 200,000 PPI.

The present invention can be understood in more detail by reference to the included description, drawings, examples, and claims. It should also to be understood that this invention is not limited to the specific devices, systems, and/or methods disclosed unless otherwise specified, and as a consequence can vary. It is also to be understood that the terminology used herein is only for the purpose of describing particular aspects and is not intended to be limiting. The included description of the invention is provided as an enabling teaching of the invention in its best, currently known embodiment. Toward that end, those skilled in the relevant art will recognize and appreciate that changes can be made to the various aspects of the invention described herein, while still obtaining the present invention's beneficial results. For example, although the current invention is described with regard to tubular elements with uniform porosity, and a circular cross section, it is clear that cross sectional shape and material porosity can be varied by changes in manufacturing technique, and can easily be altered to provide square, rectangular, or other shapes, as well as to incorporate alternative metals and material porosities. In addition, various manufacturing techniques allow the production of sintered elements which combine different porosities, or even different metals, into a single element. Accordingly, those skilled in the art will recognize that many modifications and adaptations to the present invention are possible, and can even be desirable in certain circumstances, and are a part of the present invention. Thus, the included description is provided as illustrative of the principles of the present invention and not in limitation thereof.

We claim:

1. A firearm suppressor comprising one or more thermal energy absorbing elements manufactured by sintering of powdered metals to form a porous metal having a void volume ranging from 20% to 60% and 250-250,000 pores per inch.

2. The firearm suppressor of claim 1 wherein one or more solid metal elements are interposed between said one or more porous energy absorbing elements.

3. The firearm suppressor of claim 1 wherein one or more metal elements of a porosity different from said one or more thermal energy absorbing elements are interposed between said one or more thermal energy absorbing elements.

4. The firearm suppressor of claim 1 wherein said porous metal is manufactured by sintering.

5. The firearm suppressor of claim 1 wherein said porous metal is manufactured by additive manufacturing.

6. The firearm suppressor of claim 1, wherein said one or more thermal energy absorbing elements incorporates porous metal manufactured with two or more different porosities in the same individual element.

7. The firearm suppressor of claim 1, wherein said one or more thermal energy absorbing elements incorporates porous metals manufactured with two or more different porosities in the same suppressor.

8. The firearm suppressor of claim 1, wherein said one or more thermal energy absorbing elements incorporates porous metal manufactured from two or more different metals in the same individual element.

9. The firearm suppressor of claim 1, wherein said one or more thermal energy absorbing elements incorporates porous metals manufactured with two or more different metals in the same suppressor.

10. The firearm suppressor of claim 1, wherein the porous metal is selected from the group consisting of stainless steel, brass, copper, nickel, titanium, refractory metals, and alloys thereof.

11. A firearm having said firearm suppressor of claim 1 directly attached thereto.

12. A firearm having said firearm suppressor of claim 1 attached to a muzzle device already attached directly to said firearm.

13. The firearm suppressor of claim 1, wherein said porous metal has a porosity ranging from 1250 pores per inch to 250,000 pores per inch.

14. The firearm suppressor of claim 1, wherein said void volume ranging from 20% to 45%.

15. The firearm suppressor of claim 14, wherein said porous metal has a porosity ranging from 250 pores per inch to 250,000 pores per inch.

16. The firearm suppressor of claim 15, wherein said porous metal has a porosity ranging from 1250 pores per inch to 250,000 pores per inch.

17. The firearm suppressor of claim 1, wherein said one or more thermal energy absorbing elements are housed inside an external tubular housing.

18. The firearm suppressor of claim 1, wherein said one or more thermal energy absorbing elements are housed inside an external tubular housing with two opposing endcaps.

* * * * *